(No Model.)

A. J. BROWN.
SWEEP.

No. 601,627. Patented Apr. 5, 1898.

Witnesses
W. H. Doyle.
V. B. Hillyard.

Andrew J. Brown, Inventor
By his Attorneys,
C. A. Snow & Co.

THE NORRIS PETERS CO., PHOTO-LITHO., WASHINGTON, D. C.

UNITED STATES PATENT OFFICE.

ANDREW J. BROWN, OF BOLD SPRING, GEORGIA.

SWEEP.

SPECIFICATION forming part of Letters Patent No. 601,627, dated April 5, 1898.

Application filed September 14, 1897. Serial No. 651,626. (No model.)

*To all whom it may concern:*

Be it known that I, ANDREW J. BROWN, a citizen of the United States, residing at Bold Spring, in the county of Franklin and State of Georgia, have invented certain new and useful Improvements in Sweeps; and I do hereby declare the following to be a full, clear, and exact description of the invention, such as will enable others skilled in the art to which it appertains to make and use the same.

This invention relates to a sweep attachment for plows, cultivators, and the like for cotton or corn, and is designed to provide a sweep which can be attached to any plow foot or standard by means of a single bolt and which can be secured in an adjusted position against any possible derangement or turning of the sweep upon its fastening-bolt.

The principal feature of the invention is a sweep having its bent end provided with straight edges disposed at different relative angles and adapted to underlap the plow point or shovel, so as to prevent the sweep turning upon its fastening-bolt when properly adjusted.

The invention also consists of the novel structural features and combination of parts, which hereinafter will be more particularly set forth, illustrated, and finally claimed.

Figure 1:
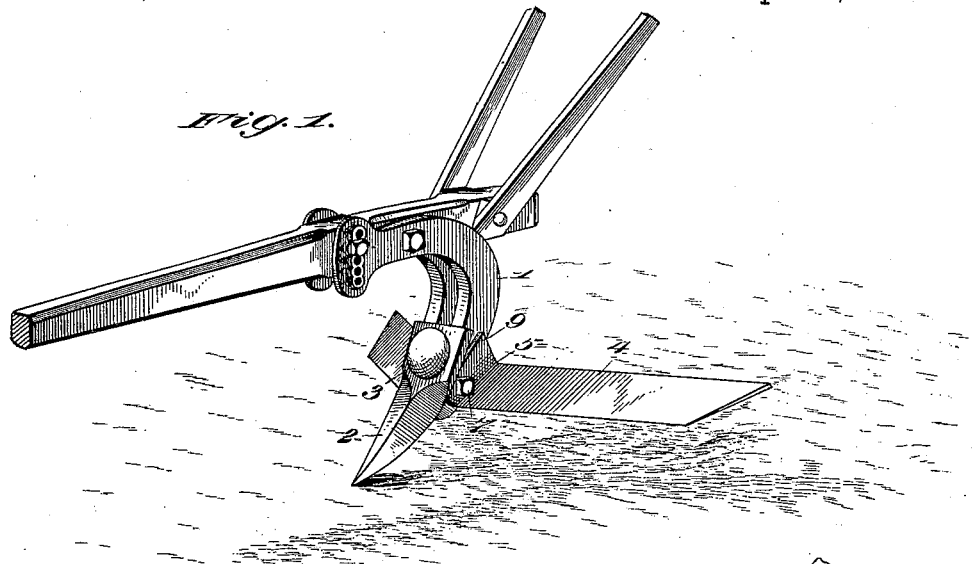
Figures 2, 4:
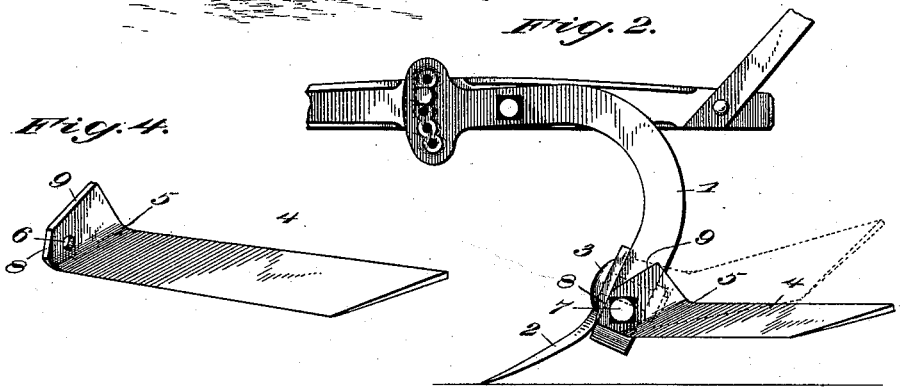
Figure 3:
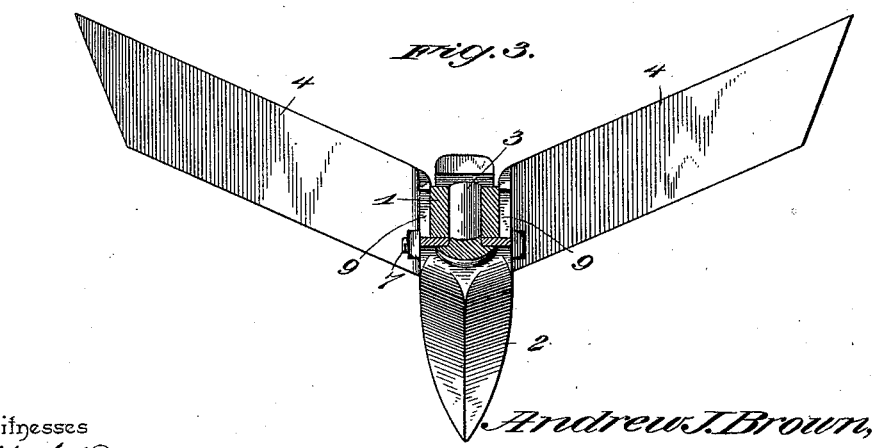

In the drawings, Figure 1 is a perspective view of a plow foot or standard, showing the application of the invention. Fig. 2 is a side elevation, the dotted lines showing an adjusted position of the sweep. Fig. 3 is a plan section. Fig. 4 is a detail view of a sweep.

Corresponding and like parts are referred to in the following description and indicated in the views of the drawings by the same reference characters.

The plow foot or standard 1 may be of any of the ordinary varieties and is provided at its lower end with a point or shovel 2, of any pattern, according to the character of work and nature and condition of the soil, said point being secured to the standard by a bolt 3 in any desired manner. A sweep is secured to each side of the standard at its lower end, and consists of a blade 4, having one edge sharpened and placed to the front and having its inner end bent about at right angles upon an oblique line, as shown at 5, said bent end having an opening 6 for the passage therethrough of a bolt 7, by means of which the sweeps are secured to the standard. The bent end 5 is formed with straight edges 8 and 9, disposed at an angle relative to each other, and which are adapted to engage with the rear side of the upper portion of the plow point or shovel 2, whereby the sweep is prevented from turning upon its fastening-bolt 7. When the straight edge 8 is made to abut against the rear side of the shovel 2, the blade 4 inclines slightly from the horizontal in an upward and rearward direction from its cutting edge, thereby permitting the weeds, grass, and other objectionable growths cut down to pass over the sweep and fall upon the ground in the rear thereof. When the straight edge 9 is brought against the rear side of the shovel, the blade 4 inclines abruptly and causes the grass, weeds, and other growths cut down to move outward toward the end of the sweep in a row or line. When adjusting the sweep, the bolt 3 is loosened sufficiently to admit of the point or angle intermediate of the straight edges 8 and 9 clearing the rear side of the shovel 2 when shifting the sweep from one position to another. In making this adjustment it is only necessary to loosen the bolt 7, so as to admit of the sweep being turned thereon. It is obvious that the point or shovel may remain undisturbed and that the bolt 7 may be removed when changing the position of the sweep.

For purposes of cultivating, a sweep will be applied to each side of the plow foot or standard, and the sweeps will be similarly arranged. The edge portions of the point or shovel 2 project beyond the sides of the standard any required distance, so as to overlap the straight edges of the sweeps and retain the latter in an adjusted position and prevent their turning upon the fastening-bolt 7 after the parts have been properly positioned and secured.

Having thus described the invention, what is claimed, and desired to be secured by Letters Patent, is—

In combination, a plow foot or standard, a plow point or shovel secured to the lower end of the standard and projecting beyond the side thereof, a sweep comprising a blade having its inner end bent about at right angles upon an oblique line and terminating in straight edges disposed at different relative angles to each other and adapted to underlap and touch the rear side of the said point or shovel, and a fastening-bolt securing the sweep to the standard and passing through an opening in the bent end of the blade, substantially as and for the purpose set forth.

In testimony whereof I have signed this specification in the presence of two subscribing witnesses.

ANDREW J. BROWN.

Witnesses:
E. CRITTENDEN,
S. A. LANGSTON.